United States Patent [19]

Aoyama

[11] Patent Number: 5,018,096

[45] Date of Patent: May 21, 1991

[54] SECURITY ADMINISTRATOR FOR AUTOMATICALLY UPDATING SECURITY LEVELS ASSOCIATED WITH OPERATOR PERSONAL IDENTIFICATION DATA

[75] Inventor: Mitsunobu Aoyama, Oome, Japan

[73] Assignee: Kabushiki Kaisha Toshiba, Kawasaki, Japan

[21] Appl. No.: 289,159

[22] Filed: Dec. 23, 1988

[30] Foreign Application Priority Data

Dec. 28, 1987 [JP] Japan .................. 62-334755

[51] Int. Cl.$^5$ .................. G06F 12/14; G06F 1/00; H04L 9/00

[52] U.S. Cl. .................. 364/900; 364/918.7; 364/969; 364/222.5; 364/245.8; 364/246.6; 364/286.5; 340/825.31; 340/825.34; 380/4; 380/25

[58] Field of Search ... 364/200 MS File, 900 MS File; 340/825.31, 825.34–825.36; 380/4, 44, 46, 25

[56] References Cited

U.S. PATENT DOCUMENTS

| | | | |
|---|---|---|---|
| 3,984,637 | 10/1976 | Caudill et al. | 364/200 |
| 4,000,487 | 12/1976 | Patterson et al. | 364/200 |
| 4,104,721 | 8/1978 | Markstein et al. | 364/200 |
| 4,218,738 | 8/1980 | Matyas et al. | 364/200 |
| 4,259,720 | 3/1981 | Campbell | 364/200 |
| 4,386,266 | 5/1983 | Chesarek | 380/25 |
| 4,531,023 | 7/1983 | Levine | 364/900 |
| 4,652,990 | 3/1987 | Pailen et al. | 380/4 |
| 4,713,753 | 12/1987 | Boebert et al. | 364/200 |
| 4,719,566 | 1/1988 | Kelley | 364/200 |
| 4,812,994 | 3/1989 | Taylor et al. | 364/200 |
| 4,951,249 | 8/1990 | McClung et al. | 380/25 |

Primary Examiner—Stuart N. Hecker
Assistant Examiner—George C. Pappas
Attorney, Agent, or Firm—Finnegan, Henderson, Farabow, Garrett and Dunner

[57] ABSTRACT

A check memory stores the data to limit a range of terminal devices usable by operators and a range of items accessible by operators, such as files, data and application programs. When an operator operates a computer system, he enters his personal identification data to the computer system by a termainal device. A checker contained in the computer system checks if the operator specified by the entered personal identification data is authorized to use the terminal device, and if he is authorized to access the entered file. The check is performed based on the contents of the check memory. When he is authorized, the executed of the job is permitted. When he is not authorized, the execution of the job is prohibited. A personal data memory stores the data of his personnel administration and the data of his section in a company. When the section to which an operator has belonged is changed to another section, the personal data in the personal data memory is changed. In this case, a security level changing unit checks its change, and if necessary, changes the contents of the check memory, thereby to change the range of job to be executed by that operator.

15 Claims, 5 Drawing Sheets

| ID NO. | NAME | PASS-WORD | SECTION | POSITION | OCCUPATION | ENTERING DATA |
|---|---|---|---|---|---|---|
| 001 | ○○○ | CAA | TECHNICAL DEVELOPMENT | GENERAL MANAGER | MANAGEMENT + SYSTEM DEVELOPMENT | OCT., '68 |
| 002 | △△△ | CBB | TECHNICAL DEVELOPMENT | MANAGER | MANAGEMENT + SYSTEM DEVELOPMENT | OCT., '78 |
| 026 | □□□ | NONE | TECHNICAL DEVELOPMENT | NONE | PROGRAMMER | SEPT., '87 |
| n | ××× | CFF | SALES AFFAIRS | NONE | SALES DIV. | SEPT., '86 |

F I G. 4

| ID NO. | PASS-WORD |
|---|---|
| 001 | CAA |
| 002 | CBB |
| ⋮ | ⋮ |
| 026 | CDD |

FIG. 5

| ID NO. | PASS-WORD | LEVEL |
|---|---|---|
| 001 | CAA | III |
| 002 | CBB | III |
| ⋮ | ⋮ | ⋮ |
| 026 | CDD | I |

FIG. 7

| ID NO. | PASS-WORD | FILE NO. |
|---|---|---|
| 001 | CAA | NO.1~5 |
| 002 | CBB | NO.1~4 |
| ⋮ | ⋮ | ⋮ |
| n | CFF | NO.13~16 |

FIG. 8

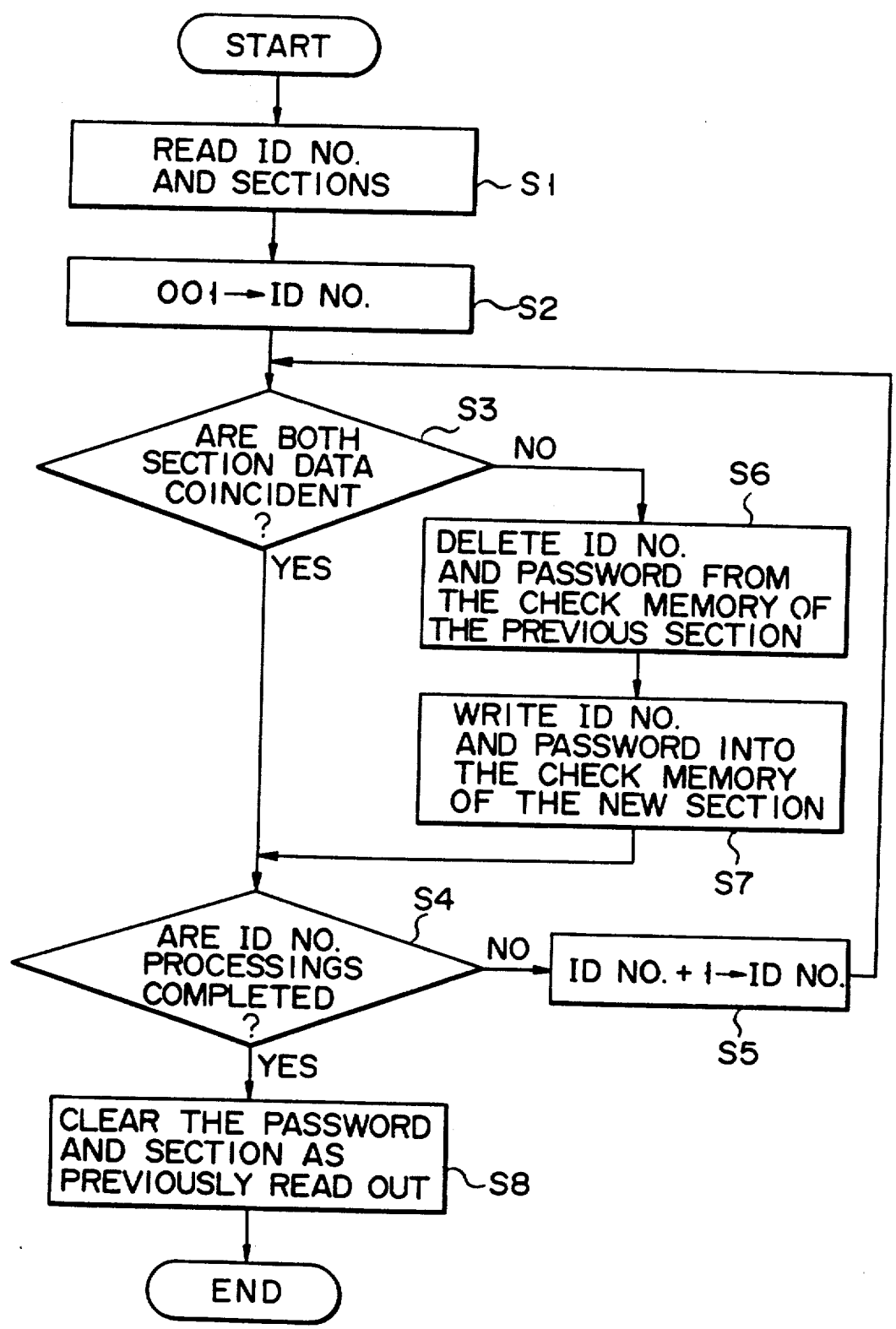
F I G. 6

SECURITY ADMINISTRATOR FOR AUTOMATICALLY UPDATING SECURITY LEVELS ASSOCIATED WITH OPERATOR PERSONAL IDENTIFICATION DATA

BACKGROUND OF THE INVENTION

1. Field of the Invention

This invention relates to a data processing system and, more particularly, to a data processing system capable of automatically changing security levels specified by, for example, an operator password, in accordance with the personnel information about the operator.

2. Description of the Related Art

In the field of data processing systems, the word "security" generally means, in its broad sense, the protection of the systems against any accident. Herein, the word is used, in a narrow sense, to mean the protection of the systems against an unauthorized use of the systems or an unauthorized use of the data stored in the systems.

One method to preserve the security of data processing systems is to require the use of passwords in accessing such systems. The passwords are specific to the operators or users authorized to access the system.

Each password defines specific security levels. Among the many possible security levels is a first level defining the files or data which the owner of the password can use, a second level defining terminal devices which the owner of the password can operate, and so on. As is shown in FIG. 1, a password for a user authorized to use the system is generated by means of password generator 1. The password is stored in a memory 2 incorporated in the system. When this person wishes to access the data processing system, he inputs his password to password check unit 3 incorporated in the system, by operating a terminal device connected to the system. From the input password, check unit 3 checks the security levels associated with the input password to determine whether the person is authorized to use the system, to use the terminal device, or to have an access to any specific file or data stored in the system. If YES, the data processing system operates in accordance with the instructions this person gives by operating the keyboard of the terminal device. If NO, check unit 3 generates an alarm and the system does not work in accordance with instructions input by this person.

In an organization, the security levels defined by an operator's password may be altered whenever the operator is transferred to another section of the organization or promoted. That is, new security levels for the operator it is necessary to rewrite the operator's password so that the password defines the new security levels, or it is necessary for the operator's superior or similar individual to store a new password defining the new security levels for the operator into memory 2.

SUMMARY OF THE INVENTION

The object of the present invention is to provide a data processing system capable of automatically changing security levels specified by, for example, an operator password, in accordance with the personnel information about the operator.

According to the invention, there is provided a data processing system capable of performing a security administration, having:

terminal devices for entering personal identification data (such as personal ID numbers, passwords, and personal details);

check memories for storing the personal identification data to specify kinds of jobs accessible by operators;

a check unit connected to said terminal devices and said check memories, for determining whether an operator specified by the entered personal identification data is authorized to use the system, if the answer to the check is yes, said check unit permitting the operator to use the job, and if the answer is no, said check unit prohibiting the operator from using the job;

personal data memory for storing the personal data about operators (such as personnel administration data and system data such as sections to which operators belong, and occupations); and a data changing unit for detecting change in the personal data stored in said individual data memory, and if necessary, for changing the contents of said check memory and the range of the job accessible by the operator.

With the data processing system according to the invention, jobs which an authorized operator can perform by using the system are automatically changed as the personal data about the operator, including personnel data, are altered. Therefore, it is unnecessary for the operator to rewrite his password so that the password defines the new security levels, or for the operator's superior to store a new password defining the new security levels for the operator into an memory incorporated in the system.

BRIEF DESCRIPTION OF THE DRAWINGS

FIG. 4 schematically shows an example of the table of data stored in the personal data memory used in the system shown in FIG. 3;

FIG. 5 shows an example of a table of data stored in one of the check memories used in the system shown in FIG. 3;

FIG. 6 is a flow chart explaining the sequence of steps for changing security levels; and FIGS. 7 and 8 show examples of two tables of data which can be stored in the check memories.

DETAILED DESCRIPTION OF THE PREFERRED EMBODIMENT

An preferred embodiment of the invention will now be described, with reference to the accompanying drawings.

Figure 1:
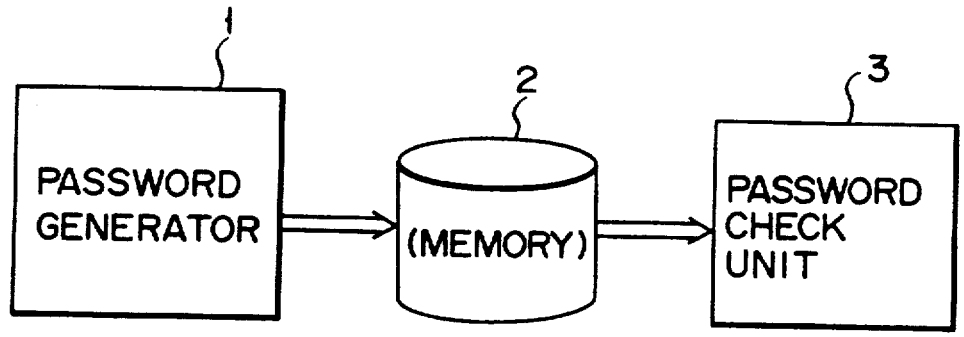
FIG. 1 is a block diagram showing the security administration system incorporated in a conventional data processing system.
Figure 2:
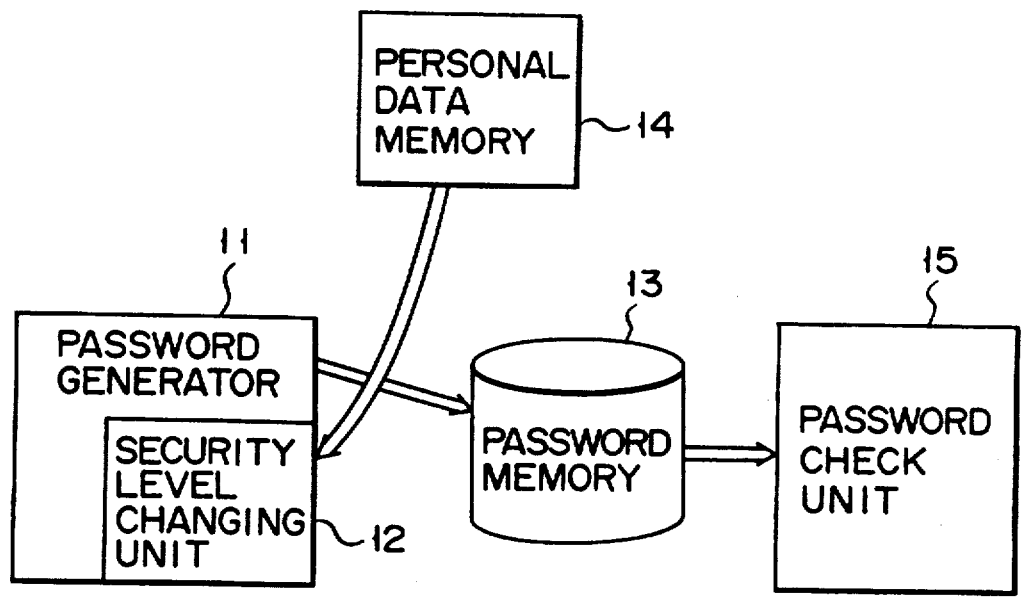
FIG. 2 is a block diagram showing the security administration system incorporated in a data processing system according to the present invention.

FIG. 2 schematically represents the security administration unit incorporated in a data processing system according to the present invention. The security administration unit comprises operator password generator 11, personal data memory 14, and password check unit 15. Operator password generator 11, which includes security level changing unit 12, is designed to generate operator passwords. Every password generated by generator 11 is stored into password memory 13. Memory 13 is connected to personal data memory 14 which stores personal data (for example, personnel data, and the data showing the departments in which operators work) about the operators authorized to use the data processing system. Security level changing unit 12 automatically changes the security level of an operator password in accordance with the personal data stored in memory 14. Any password, whose security level has been changed by unit 12, is stored in memory 13. Operator password check unit 15 checks the operator passwords stored in memory 13.

In operation, password generator 11 generates a password assigned to an operator authorized to use the data processing system. The password is stored in password memory 13. To use the system, the operator inputs a password to the security administration unit by operating an input device (not shown). This password is supplied to password check unit 15. Unit 15 checks the password to determine whether the operator is authorized to access the files or data stored in the data processing system.

Security level changing unit 12 monitors personal data memory 14. Assuming that the operator is promoted, is transferred to another section (department) of an organization, or undergoes any other change in personnel affairs, the personal data about him, which is stored in memory 14, is altered. Unit 12 detects this alteration, and automatically changes or updates the security level of the operator's password in accordance with the altered personal data. Hence, password compare unit 15 can check the password input by the operator with the updated security level of the password.

Figure 3:
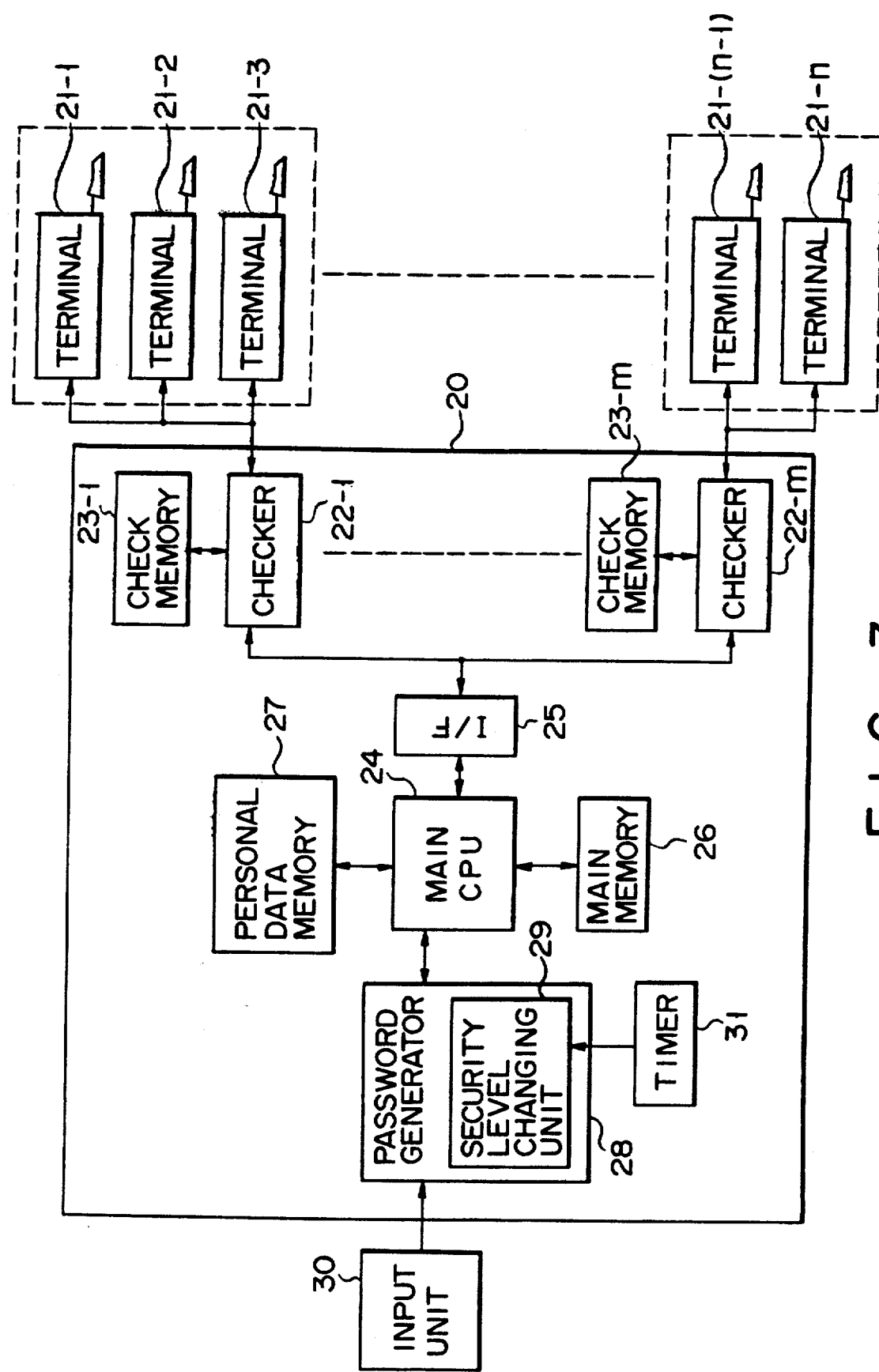
FIG. 3 is a block diagram showing the data processing system incorporating the security administration section shown in FIG. 2.

As is shown in FIG. 3, the data processing system according to the invention comprises computer main frame 20 and a plurality of terminal devices 21-1 to 21-n connected to main frame 20. For example, terminal devices 21-1 to 21-3 are for the use in a technical development department, and terminal devices 21-(n−1) and 21-n are for use in a personnel department.

Each terminal device comprises a cord reader and a keyboard. In order to access the data stored in computer main frame 20, an operator operates the keyboard of one of the terminal devices, thereby inputting his password, his ID number, and necessary data to main frame 20.

As is shown in FIG. 3, computer main frame 20 comprises password checkers 22-1 to 22-m, check memories 23-1 to 23-m connected to checkers 22-1 to 22-m, respectively, main CPU 24, interface 25 connecting memories 23-1 to 23-m to main CPU 24, main memory 26 coupled to main CPU 24, personal data memory 27 also coupled to main CPU 24, password generator 28 including security level changing unit 29, and timer 31 connected to unit 29. Password generator 28 is connected to input unit 30 which is outside computer main frame 20.

Each password checker is connected to the terminal devices for use in one department. For instance, checker 22-1 is coupled to terminal devices 21-1 to 21-3 which are installed in the technical development department, and checker 22-m is connected to terminal devices 21-(n−1) and 21-n which are installed in the personnel department. Each check memory stores the passwords and ID numbers of the operators authorized to operate the terminal devices coupled to the password checker which in turn is connected to the check memory.

Main memory 26 stores operation programs, fixed data, and a great amount of sorted data. In necessary, an auxilliary memory (not shown) can be connected to to main memory 26. Personal data memory 27 stores various items of data, such as personnel data, the organization map of the company, a list of authorized users of the data base installed in the system. These data items are used to change the security levels of operator passwords, as will be explained later.

Checkers 22-1 to 22-m, password generator 28, and password changing unit 29 each comprise a CPU, a memory, and a peripheral circuit. According to the invention, main CPU 24 can be so designed to perform functions of checkers 22-1 to 22-m, password generator 28, and password changing unit 29, in which case components 22-1 to 22-m, 28, and 29 will be dispensed with.

Personal data memory 27 stores, for example, the table of data shown in FIG. 4. As has been pointed out, memory 27 stores the personnel data, the organization map of the company, and the list of the authorized users of the data base installed in the system. The personnel data includes: the employees' names, their ID numbers, their passwords, their section, their positions, their tasks or occupation, the dates of their entry to the company, and other personnel information.

Each 23-1 to 23-n stores ID numbers and passwords of those persons who are authorized to operate terminal devices connected to the checker to which the check memory is coupled. More specifically, check memory 23-1, for example, stores the ID numbers and passwords of the operators authorized to use terminal devices 21-1 to 21-3, as can be understood from FIG. 5.

The general operation of the data processing system shown in FIG. 3 will now be explained.

When an employee is authorized to use the system, an operator of the computer administration section inputs the ID number of the employee to password generator 28 via input unit 30. In accordance with the ID number, password generator 28 generates the password of the employee. Main CPU 24 writes this password in the table stored in personal data memory 27, and also in the check memory coupled to the checker which in turn is connected to the terminal devices installed in the new employee's department.

For example, the employee, whose ID number is "26," is authorized to use the data processing system, and that password generator 28 generates "CDD" as his password. Main CPU 24 writes the password "CDD" over "none" in personal data memory 27, in the password column of the row for the ID number "26" (see FIG. 4). Then, CPU 24 checks the data recorded in this column, and determines that this employee is one of the technical development staff. CPU 24 writes the ID number "26" and the password "CDD" into check memory 23-1 which is assigned to the technical development department.

The terminal devices, which any authorized employee can operate, are only those assigned to his department; he is not authorized to operate the other terminal devices connected to computer main frame 20. For example, a person who is authorized to use the system and who belongs to the technical development department can operate terminal devices 21-1 to 21-3 only.

Let us assume that the employee who belongs to the technical development department and who is authorized to use the system and thus given password "CBB" wishes to use the data processing system. To use the system, he operates terminal device 21-1, 21-2 or 21-3 assigned to his department, i.e., the technical development department. First, he inserts his ID card into the terminal device, and inputs his password "CBB" into checker 22-1 by operating the keyboard of the terminal device. His ID number "002" is automatically input into checker 22-1. Checker 22-1 determines whether both the ID number and the password are stored in check memory 23-1. If memory 23-1 does not store the ID number and password of this employee, checker 22-1 supplies an error signal to the terminal device. Then, the terminal device displays "ERROR" on its display screen, and, if necessary, gives an alarm. This prevents an unauthorized use of the data processing system. If memory 23-1 stores both the ID number and the password, checker 22-1 outputs a terminal-use permission signal to the terminal device. In this case, the employee may further operate the terminal device. In the data processing system, the types of files which can be accessed from each terminal device are limited.

It will be described how to change security levels in this data processing system, with reference to the flow chart shown in FIG. 6.

If the employee whose ID number is "002" has been transferred from the technical development department to the personnel department, and his task is changed from "Management + System Development" to "Management," the data showing this event is input to computer main frame 20, by operating terminal device 21-(n − 1) or 21-n which is installed in the personnel department. Main CPU 24 updates the data recorded in the row of the table stored in personal data memory 27, changing "Technical Development" and "Management + System Development" to "Personnel" and "Management," respectively.

In the meantime, timer 31 outputs an interrupt signal to security level changing unit 29, at regular intervals, e.g., 24 hours, one week, two weeks. Upon receipt of the interrupt signal, unit 29 performs its function as will be explained with reference to the flow chart (FIG. 6).

First, in step S1, unit 29 reads, from personal data memory 27, all ID numbers and the data items recorded in all section columns (FIG. 4), from personal data memory 27. Security level changing unit 29 stores all ID numbers and all section data items previously stored in memory 27 before the data-updating.

In step S2, unit 29 sets the first ID number, "001", as an initial value. In step S3, unit 29 determines whether the updated section data item is identical with the previous section data item. If YES, unit 29 then determines, in step S4, whether all updated section data items have been compared with the corresponding previous data items. If NO in step S4, as in the present instance, unit 29 increments the ID number "001" by one, thus changing it to "002," in step S5. The control then returns to step S3.

In this case, in step S3, unit 29 determines that the updated department data item associated with the ID number "002", i.e., "Personnel", is not identical with the previous data item, i.e., "Technical Development." Hence, the control goes to step S6, in which the ID number "002" and the password is detected from check memory 23-1. In the next step, S7, the ID number "002" and the password "CBB" are written into check memory 23-m which is assigned to the personnel section. Then, in step S4, unit 29 determines whether all updated section data items have been compared with the corresponding previous data items.

The decision made in step S4 is NO in this instance, and steps S3 to S7 are repeated for the section data items associated with the other ID numbers stored in personal data memory 27. When the decision "YES" is made in step S4, the control goes to step S8. In step S8, all previous section data items are deleted from security level changing unit 29, whereas the updated section data items remain stored in unit 29 and will be used in the next data-updating.

The ID number "002" and password "CBB" of the employee transferred to the personnel section are no longer stored in check memory 23-1; they are stored in check memory 23-m. Hence, he will be prohibited from using terminal 23-1, 23-2 or 23-3 assigned to the technical developement section, but he is now authorized to use terminal device 21-(n − 1) or 21-n assigned to the pesonnel section.

As may be understood from the above, the security levels for each person authorized to use the data processing system can be changed automatically whenever necessary. Therefore, the files which the authorized person can access are automatically changed, and the terminal devices which this person can operate are also automatically changed when the section data item associated with his ID number is changed to another. His password need not be changed to after the security levels associated with that password. Nor is it necessary for any operator of the computer administration section to operate input unit 30 to change the security levels. Further, the operators of the computer administration section need not input the personnel data or the organization map since these data items have already been input from the terminal device designed for the personnel section. This helps to lessen the work of the staff of the computer administration section.

Another security administration section according to the invention will now be explained. This section is designed to limits the types of accessible files in accordance with the security levels assigned to an operator. Each check memory used in this security administration section stores the table of data shown in FIG. 7. This table contains operators' ID numbers, their passwords, and their security levels. Specific types of files, data and application programs are assigned to the security level of each authorized operator. The high security level III is assigned to system programmers; the intermediate security level II is assigned to normal programmers; and the low level I is assigned to inexperienced programmers, called "green" programmers. The higher his security level, the more variable files the operator can access.

For example, and an operator whose ID number is "00m" and who belongs to the technical developement department wishes to access a file stored in computer main frame 20. The operator operates terminal device 21-1, 21-2, 21-3 assigned to the technical development section, thereby inputting his ID number, his password, and data designating the file which he wants, into checker 22-1. Checker 22-1 checks the ID number, the password and the file-designating data, and determines whether the operator is authorized to operate the terminal device, and also to use the designated file. If YES, checker 22-1 permits data transfer between the terminal device and main CPU 24.

Security level changing unit 29 reads the data items showing the dates when the authorized operators joined the company, sequentially from personal data memory 27. Unit 29 calculates the period of employment of each operator from the date when the operator joined the company. Unit 29 changes the security level of any operator whose period of employment has just increased to three years, from level I to level II. Further, unit 29 periodically checks the task data items stored in memory 27 and representing the tasks of the authorized operators. When any operator is qualified as a system programmer, unit 29 changes his security level, from level I or II to level III.

In the case where the data processing system is a data-base system, the second embodiment of the security administration section may be modified so as to permit the level-I operators to read data from computer main frame 20, and the level-II operators and the level-III operators to read data from main frame 20, to input data to, and to alter the data stored in main frame 20.

The present invention has been described, with reference to the embodiments. Nonetheless, this does not necessarily mean that the invention is limited to those embodiment. Various modifications or changes can be made within the scope of the invention. For example, the files, which can be accessed by the authorized operators, can be stored in the check memories, as is illustrated in FIG. 8. If this is the case, the checker checks the ID number, the password and the data designating the file which the operator wishes to use, and determines whether or not the operator is authorized to use the designated file. The files, which the operator can access, can be replaced with others by changing the data stored in personal data memory 27.

The embodiments described above are security administration sections designed for automatically changing the security levels of the operators authorized to use the system, thereby limiting the terminal devices and the files which each operator can operate and access. Nonetheless, the present invention can apply to a security administration unit of the type which identifies the jobs each operator is intitled to execute, based on personal identification data such as the ID number and the password of the operator.

In the embodiments described above, security level changing unit 29 periodically checks the table of data stored in personal data memory 27. Instead, unit 29 can check the table every time main CPU rewrites the table of data stored in memory 27. In addition, every time main CPU 24 rewrites the table, it transfers the rewritten table to security level changing unit 29, in which case unit 29 changes the security levels of the operators in accordance with the rewritten table.

Also, in the embodiments described above, the ID number and password of an operator are used as data items identifying this operator. Nonetheless, according to the invention, the fingerprint, voiceprint or the pattern of views in the retina of the operator can be used to identify the operator.

What is claimed is:

1. A data processing system, having at least one input means, for authorizing access to a plurality of files stored in a memory means by a plurality of operators wherein each of said plurality of operators is authorized to access said files based on operator personal identification data stored in a first portion of said memory means and a plurality of security levels stored in a second portion of said memory means, the system comprising:

security administration means connected to said memory means for assigning a security level associated with operator personal identification data associated with one of said plurality of operators and for storing said security level in said second portion of said memory means;

security level changing means, coupled to said security adminstration means, for automatically detecting updating of said operator personal identification data and for reassigning the security level of said operator in accordance with the updated operator personal identification data; and checking means, coupled to said input means and said memory means, for comparing access information input by an operator with said stored operator personal identification data and for permitting access if said input access information corresponds to said stored operator personal identification data and for prohibiting access if said input access information does not correspond to said stored operator personal identification data.

2. The system according to claim 1, for use by an organization having sections wherein associated with each of the operators is an identification number, an attribute, a section to which each of the operators belongs, a set of tasks for which each of the operators is responsible, a status indicating the period of time for which each of the operators has been employed by the organization, and personnel administration data, and wherein said operator personal identification data associated with each of the operators includes either an identification number, an attribute, or an identification number and an attribute, and wherein data indicating the section associated with each of the operators, data indicating a status of each of the operators, or personnel administration data of each of the operators is stored in the first portion of said memory means.

3. The system according to claim 1, wherein said input means includes at least one terminal device used by an operator to input access information, and wherein said checking means determines in accordance with said stored operator personal identification data, whether the operator associated with said input access information, and wherein when the section of the operator is changed to another section, said security level changing means automatically makes invalid the security level of the operator, according to the change in the operator personal identification data, additionally stores the new security level of the operator in the section storage portion of the new section, and changes the terminal device usable by said operator from that for the old section to that for the new section.

4. The system according to claim 3, for use in an organization having sections, in which said personal data storing means includes a means for storing section data of the section to which the authorized operators belong, wherein each section is provided with terminal devices being used exclusively for said section, wherein the authorized operators are permitted to use only the terminal devices of the section of the authorized operator, wherein said security level storing means corresponds to a section and stores the personal identification data of the authorized operators in the corresponding section, and wherein when the section of an authorized operator is changed to another section, said security level changing means makes invalid the personal identification data of the operator stored in said security level storing means of the old section, according to the change in the contents of said personal data storing means, additionally stores the personal identification data and security level of the authorized operator to the security level storing means of the new section, and changes the terminal devices usably by said authorized operator from those for the old section to the new section.

5. The system according to claim 2, wherein, when an operator is authorized to use the computer system, said input means inputs the operator personal identification data of said operator, and said security level changing means stores the security level of said operator in a section storage portion of said second portion of said memory means corresponding to the section of the operator.

6. The system according to claim 1, wherein said operator personal identification data of each of the operators and the data of any of the files accessible by each of the operators and the files accessible by each of the operators are limited by the contents of said second portion of said memory means, and wherein when the contents of said first portion of said memory means is changed, said security level changing means changes the contents of said second portion of said memory means, to thereby change the files accessible by each of the operators, and said checking means checks to determine whether an operator specified by the input identification access information may be authorized to access the files, according to the contents of said second portion of said memory means.

7. (Twice Ameded) The system according to claim 6, for use in an organization having a plurality of sections, wherein section data of the sections to which each of the operators belongs is stored in said first portion of said memory means, and the files accessible by each of the operators are limited for each section, and wherein when the section of an operator is changed to another section, said security level changing means changes the contents of said second portion of said memory means.

8. (Twice Amended) The system according to claim 6, wherein said first portion of said memory means includes data representing technical levels of each of the operators, and identifiers for the files accessible by each of the operators are assigned for these technical levels, and wherein when the technical level of one of the plurality of operators is changed to another level, said security level changing means changes the contents of said second portion of said memory means, to thereby change the files accessible by said operator, according to the contents of said first portion of said memory means.

9. (Twice Amended) The system according to claim 1, wherein said security level changing means includes means connected to said memory means, for reading out operator personal identification data from said first portion of said memory means,
 means for retaining the operator personal identification data read out from said first portion of said memory means,
 means for detecting noncoincidence between the previously read out operator personal identification data retained in said retaining means with the newly read operator personal identification data retained in said retaining means through comparison of said previously read out operator personal identification data and presently read out operator personal identification data, and
 means for reassigning the security level stored in said second portion of said memory means according to the noncoincidence.

10. (Twice Amended) The system according to claim 9, further comprising timer means for measuring time and producing an interrupt signal at fixed time intervals, and
 wherein said read means responds to said interrupt signal from said timer means to read out the operator personal identification data of said data first portion of said memory means,
 said retaining means responds to said interrupt signal to retain the operator personal identification data read out of said first portion of said memory means,
 said detecting means compares previously read-out operator personal identification data and newly read-out operator personal identification data, and
 said retaining means retains the present operator personal identification data in use for next comparison of the present operator personal identification data with the operator personal identification data read out in response to next interrupt signal.

11. The system according to claim 1, wherein said system further includes a means for changing the operator personal identification data of said first portion of said memory means, and
 said security level changing means receives the changed contents of said first portion of said memory means and reassigns the security level of an operator associated with said changed operator personal identification data.

12. The system according to claim 1, wherein said checking means includes a means for indicating that said operator is not authorized to use the system.

13. The system according to claim 1, wherein said input means includes a plurality of terminal device, and data specifying one of the terminal devices usable by each of the operators is stored in said second portion of said memory means, and
 said checking means includes a means for checking whether the operator specificed by the input access information is authorized to use the one of the terminal devices on the basis of the contents of said second portion of said memory means and the input, and wherein
 when the terminal devices usable by each of the operators is changed to other terminal devices, said security level changing means changes the contents of said second portion of said memory means depending on a change in the operator personal identification data stored in said first portion of said memory means.

14. The system according to claim 1, wherein data limiting files accessible by each of the operators is stored in said second portion of said memory means, and wherein said checking means includes a means for checking to determine whether the operator specified by the input access information is authorized to access the file as specified, on the basis of the contents of said second portion of said memory means and the input access information, and wherein
 when a range of files accessible by an operator must be changed, said security level changing means changes the contents of said second portion of said memory means depending on a change in the operator personal identification data stored in said first portion of said memory means means.

15. The system according to claim 1, in which said security level changing means changes the security levels of each of the operators without changing the operator personal identification data of the operators.

* * * * *

UNITED STATES PATENT AND TRADEMARK OFFICE
CERTIFICATE OF CORRECTION

PATENT NO. : 5,018,096
DATED : May 21, 1991
INVENTOR(S) : Mitsunobu Aoyama

It is certified that error appears in the above-identified patent and that said Letters Patent is hereby corrected as shown below:

Title page, Abstract, line 6, change "termainal" to --terminal--.

Claim 3, column 8, lines 40 through 47, delete in their entirety (i.e. from "changed to ..." to "... new section.").

Claim 6, column 9, lines 23 and 23, delete [identification].

Claim 7, column 9, line 26, delete [(twice amended)].

Claim 8, column 9, line 35, delete [(twice amended)].

Claim 9, column 9, line 47, delete [(twice amended)].

Claim 10, column 9, line 66, delete [(twice amended)].

Claim 10, column 10, line 5, after "said" delete [(data)].

Claim 13, column 10, line 36, change "specificed" to --specified--.

Claim 13, column 10, line 40, after "put" insert --access information--.

Signed and Sealed this

Twenty-fifth Day of May, 1993

Attest:

MICHAEL K. KIRK

*Attesting Officer*      *Acting Commissioner of Patents and Trademarks*